US011226902B2

(12) United States Patent
Williams et al.

(10) Patent No.: US 11,226,902 B2
(45) Date of Patent: Jan. 18, 2022

(54) TRANSLATION LOAD INSTRUCTION WITH ACCESS PROTECTION (71) Applicant: INTERNATIONAL BUSINESS MACHINES CORPORATION, Armonk, NY (US)

(72) Inventors: Derek E. Williams, Round Rock, TX (US); Benjamin Herrenschmidt, Lyneham (AU); Cathy May, Ossining, NY (US); Bradly G. Frey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/588,380

(22) Filed: Sep. 30, 2019

(65) Prior Publication Data

US 2021/0096859 A1  Apr. 1, 2021

(51) Int. Cl.
*G06F 12/1009* (2016.01)
*G06F 12/1027* (2016.01)

(52) U.S. Cl.
CPC ...... *G06F 12/1009* (2013.01); *G06F 12/1027* (2013.01)

(58) Field of Classification Search
CPC ................. G06F 12/1009; G06F 12/1027
See application file for complete search history.

(56) References Cited

U.S. PATENT DOCUMENTS

| 6,047,354 | A | * | 4/2000 | Yoshioka | G06F 12/1027 |
| | | | | | 711/118 |
| 6,199,152 | B1 | | 3/2001 | Kelly et al. | |
| 6,412,043 | B1 | * | 6/2002 | Chopra | G06F 9/30032 |
| | | | | | 711/118 |
| 8,176,279 | B2 | | 5/2012 | Farrell et al. | |
| 8,677,077 | B2 | | 3/2014 | Farrell et al. | |
| 8,972,670 | B2 | | 3/2015 | Farrell et al. | |
| 9,542,260 | B2 | | 1/2017 | Farrell et al. | |
| 9,778,869 | B2 | | 10/2017 | Farrell et al. | |
| 2007/0079041 | A1 | * | 4/2007 | Yang | G06F 1/185 |
| | | | | | 710/301 |
| 2008/0162829 | A1 | | 7/2008 | Scott et al. | |
| 2009/0228262 | A1 | | 9/2009 | Farrell et al. | |
| 2011/0072234 | A1 | * | 3/2011 | Chinya | G06F 12/121 |
| | | | | | 711/207 |
| 2012/0047343 | A1 | | 2/2012 | Farrell et al. | |
| 2015/0081983 | A1 | | 3/2015 | Ries et al. | |

(Continued)

OTHER PUBLICATIONS

Power PC 603. Manual [online]. Motorola, Nov. 1997 [retrieved on Jun. 1, 2021]. Retrieved from the Internet: <URL: https://www.cebix.net/downloads/bebox/603eUM.pdf> (Year: 1997).*

(Continued)

*Primary Examiner* — Chie Yew
(74) *Attorney, Agent, or Firm* — Brian F. Russell; Nathan Rau (57) ABSTRACT

A processor core processes a translation load instruction including a protection field specifying a desired access protection to be specified in a translation entry for a memory page. Processing the translation load instruction includes calculating an effective address within the memory page and ensuring that a translation entry containing the desired access protection is stored within at least one translation structure of the data processing system.

22 Claims, 7 Drawing Sheets

(56) References Cited

U.S. PATENT DOCUMENTS

2015/0278085 A1    10/2015  Bybell et al.
2018/0018284 A1     1/2018  Borntraeger et al.
2019/0286575 A1*    9/2019  Hiramoto ............ G06F 12/1027

OTHER PUBLICATIONS

International application No. PCT/IB2020/058986, International filing date: Sep. 25, 2020, ISR/WO (International Search Report and Written Opinion) dated Jan. 15, 2021.

* cited by examiner

TRANSLATION LOAD INSTRUCTION WITH ACCESS PROTECTION

BACKGROUND OF THE INVENTION

The present invention relates generally to data processing and, in particular, to a translation load instruction that, when executed by a processor, causes a desired translation entry to be selectively loaded into an address translation structure.

A conventional multiprocessor (MP) computer system comprises multiple processing units (which can each include one or more processor cores and their various cache memories), input/output (I/O) devices, and data storage, which can include both system memory (which can be volatile or nonvolatile) and nonvolatile mass storage. In order to provide enough addresses for memory-mapped I/O operations and the data and instructions utilized by operating system and application software, MP computer systems typically reference an effective address space that includes a much larger number of effective addresses than the number of physical storage locations in the memory mapped I/O devices and system memory. Therefore, to perform memory-mapped I/O or to access system memory, a processor core within a computer system that utilizes effective addressing is required to translate an effective address into a real address assigned to a particular I/O device or a physical storage location within system memory.

In many architectures, the effective address space is partitioned into a number of memory pages, where each page has a respective associated address descriptor called a page table entry (PTE). The PTE corresponding to a particular memory page contains, among other information, the base effective address of the memory page as well as the associated base real address of the page frame, thereby enabling a processor core to translate any effective address within the memory page into a real address in system memory. The PTEs, which are created in system memory, for example, under the direction of operating system and/or hypervisor software, are collected in a page frame table.

In order to expedite the translation of effective addresses to real addresses during the processing of memory-mapped I/O and memory access instructions (hereinafter, together referred to simply as "memory-referent instructions"), a conventional processor core often employs, among other translation structures, a cache referred to as a translation lookaside buffer (TLB) to buffer recently accessed PTEs within the processor core. Of course, as data are moved into and out of physical storage locations in system memory (e.g., in response to the invocation of a new process or a context switch), the entries in the TLB must be updated to reflect the presence of the new data, and the TLB entries associated with data removed from system memory (e.g., paged out to nonvolatile mass storage) must be invalidated.

The present application recognizes that it would be useful and desirable to provide an improved technique for loading translation entries into address translation structures of a data processing system, such as the page frame table and TLBs.

BRIEF SUMMARY

In at least one embodiment, a processor core processes a translation load instruction including a protection field specifying a desired access protection to be specified in a translation entry for a memory page. Processing the translation load instruction includes calculating an effective address within the memory page and ensuring that a translation entry containing the desired access protection is stored within at least one translation structure of the data processing system.

DETAILED DESCRIPTION

Figure 1:
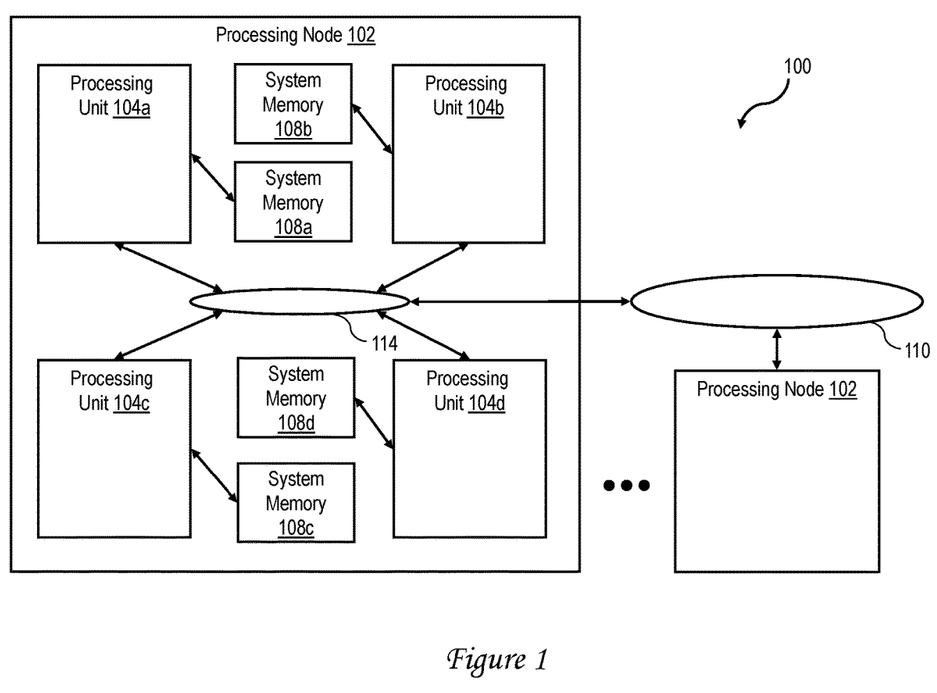
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
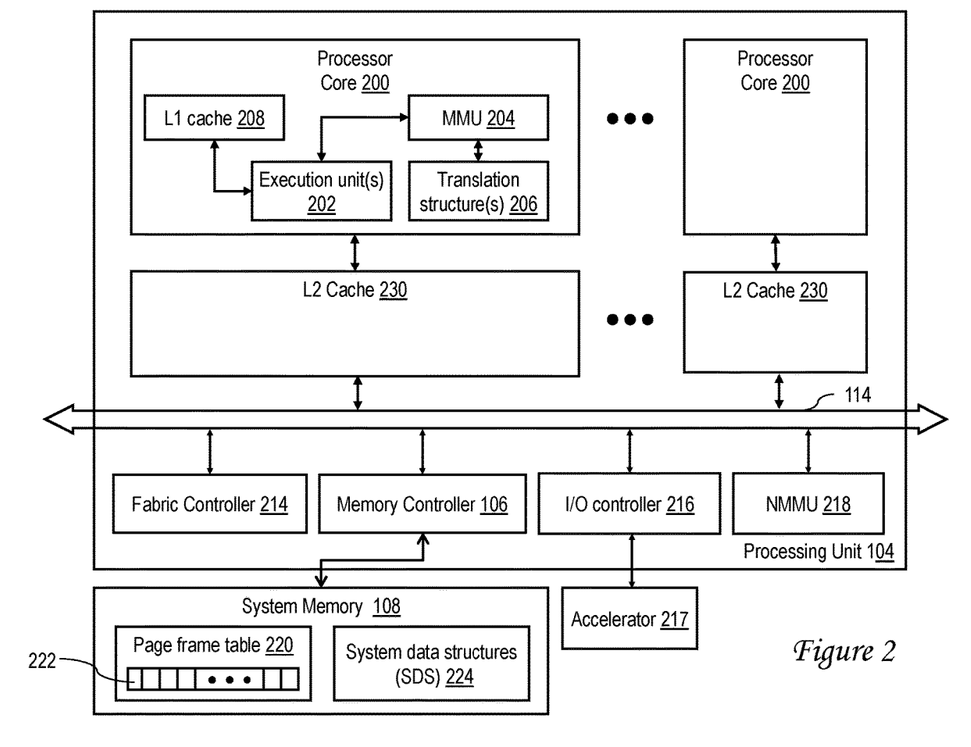
FIG. 2 is a more detailed block diagram of an exemplary processing unit in accordance with one embodiment.

Referring now to FIG. 2, there is depicted a more detailed block diagram of an exemplary processing unit 104 and a system memory 108 in accordance with one embodiment. In the depicted embodiment, each processing unit 104 is an integrated circuit including one or more processor cores 200 for processing instructions and data. In the depicted example, a processor core 200 includes one or more execution units 202 that execute instructions from multiple simultaneous hardware threads of execution.

Processor core 200 additionally includes a memory management unit (MMU) 204 responsible for translating effective addresses determined by the execution of memory-referent instructions in execution unit(s) 202 into real addresses. MMU 204 performs effective-to-real address translation by reference to one or more translation structure(s) 206, such as a translation lookaside buffer (TLB), effective-to-real address translation (ERAT) cache, segment lookaside buffer (SLB), etc. The number and/or type of these translation structures vary between implementations and architectures. Translation structure(s) 206 reduce the latency associated with address translation by buffering local copies of selected address translations, which may be retrieved from system memory 108, as discussed further below.

The operation of each processor core 200 is supported by a multi-level memory hierarchy having at its lowest level a system memory 108 shared by all processing units 104 and accessible via an integrated memory controller 106. As illustrated, system memory 108 stores one or more system data structures (SDSs) 224, which define the addresses for which effective-to-real address translation is legal (possibly through one or more intervening memory spaces) and current access protections for different regions of the address spaces. Additionally, system memory 108 stores a page frame table 220 containing a plurality of page table entries (PTEs) 222 each specifying an effective-to-real address translation for a respective corresponding memory page present in system memory 108. PTEs 222 accessed from page frame table 220 by an MMU 204 may be cached by the MMU 204 for subsequent access, for example, in a TLB implemented among translation structure(s) 206. SDSs 224 and page frame table 220 can be established, maintained, and updated, for example, by operating system and/or hypervisor software executing within data processing system 100.

The multi-level memory hierarchy of each processor core 200 additionally includes one or more levels of cache memory, which in the illustrative embodiment include a store-through level one (L1) cache 208 within and private to each processor core 200 and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 214 responsible for controlling the flow of operations on the system fabric comprising local interconnect 114 and system interconnect 110 and for implementing the coherency communication required to implement the desired cache coherency protocol. Processing unit 104 further includes an integrated I/O (input/output) controller 216 supporting the attachment of one or more I/O devices, such as, for example, accelerator 217. Processing unit 104 also includes a nest memory management unit (NMMU) 218, which, upon request, provides address translation services to other agents, such as accelerator 217, which lacks its own address translation facilities. It should be appreciated that in other embodiments, NMMU 218 may be communicatively coupled to provide address translation services to agents including accelerator 217 in an alternative or additional manner, for example, by being coupled to system interconnect 110 rather than to local interconnect 114.

Figure 3:
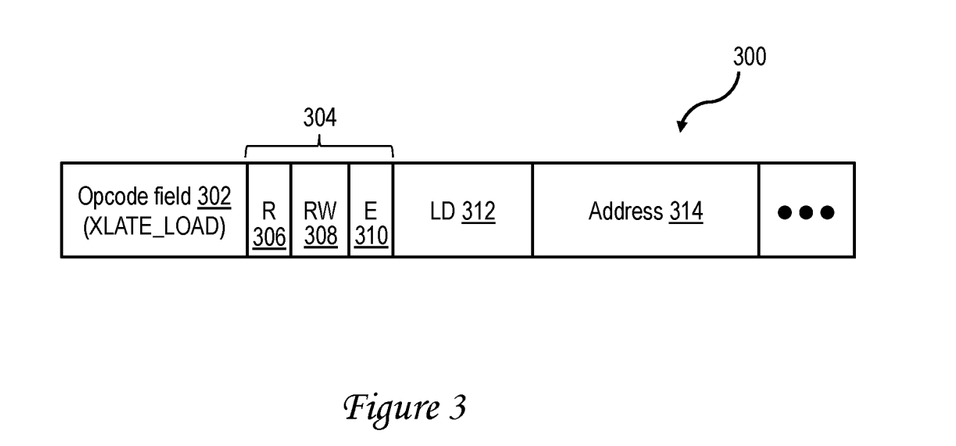
FIG. 3 illustrates an exemplary translation load instruction in accordance with one embodiment.

With reference now to FIG. 3, there is illustrated an exemplary translation load instruction 300 in accordance with one embodiment. Translation load instruction 300 can be executed, for example, by execution units 202 of a processor core 200, as described further below with reference to FIG. 5.

In the depicted embodiment, translation load instruction 300 includes an operation code (opcode) field 302 that specifies an architecture-dependent opcode that identifies instruction 300 as a translation load instruction. In addition, translation load instruction 300 includes an address field 314 identifying one or more registers from whose contents the effective address of a virtual memory page can be computed.

Translation load instruction 300 also includes protection field 304, which includes, for example, a read-only (R) bit 306, read-write (RW) bit 308, and executable (E) bit 310. R bit 306 is set (e.g., to 1) and RW bit 308 is reset (e.g., to 0) to indicate that the memory page identified by the address computed utilizing address field 314 is to be read-only. R bit 306 is reset (e.g., to 0) and RW bit 308 is set (e.g., to 1) to indicate that the memory page is to be subject to both read and write access. E bit 310 is independently set (e.g., to 1) to indicate that the memory page is to be treated as containing executable instructions and is reset (e.g., to 0) otherwise.

Translation load instruction 300 additionally includes a load (LD) field 312. In at least some embodiments, LD field 312 can be implemented with one or more bits, each corresponding to a respective one of translation structures 206 in processor core 200. In this example, a bit that is set in LD field 312 indicates that, in response to execution of translation load instruction 300, a translation for the address of the referenced memory page is to be loaded into the associated translation structure 206 in processor core 200, if needed.

Figure 4:
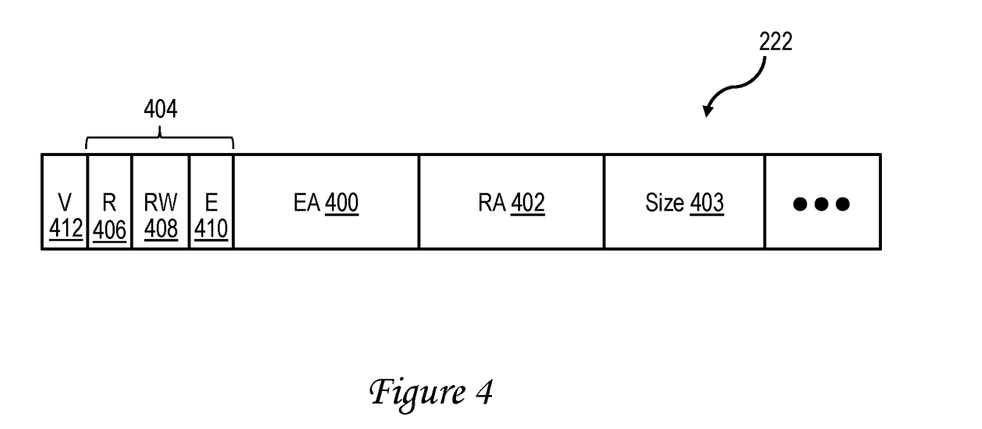
FIG. 4 depicts an exemplary page table entry in accordance with one embodiment.

Referring now to FIG. 4, there is depicted an exemplary format for a page table entry 222 in accordance with one embodiment. In this example, page table entry 222 includes an effective address field 400 that indicates the base effective address of a memory page in the effective address space, a real address field 402 that indicates the base real address of the corresponding memory page in system memory 108, a size field 403 indicating the size of the memory page, and a valid field 412 indicating whether or not the page table entry 222 is valid and can therefore be utilized for address translation. Page table entry 222 additionally includes a protection field 404 including read-only (R) bit 406, read-write (RW) bit 408, and executable (E) bit 410. As in protection field 304 of translation load instruction 302, R bit 406 is set (e.g., to 1) and RW bit 408 is reset (e.g., to 0) to indicate that the memory page is read-only, and R bit 406 is reset (e.g., to 0) and RW bit 408 is set (e.g., to 1) to indicate that the memory page can be both read and written. E bit 410 is independently set (e.g., to 1) to indicate that the memory page contains executable instructions and is reset (e.g., to 0) otherwise.

Figure 5:
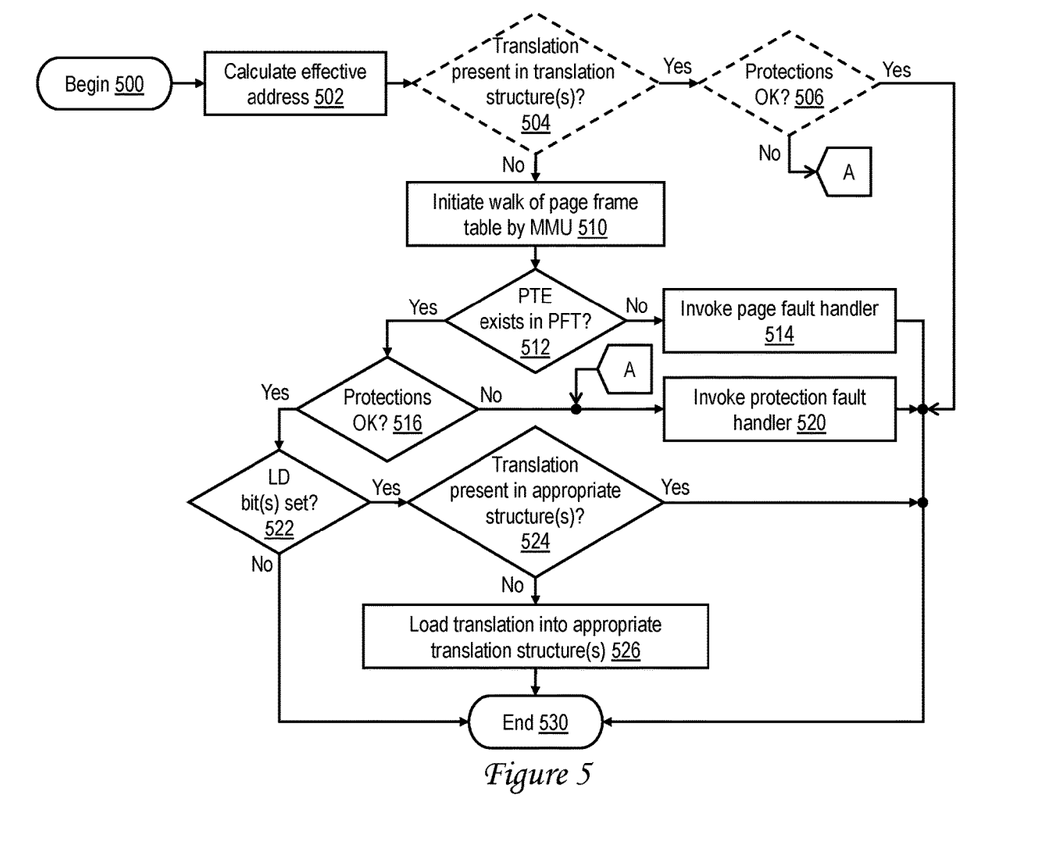
FIG. 5 is a high level logical flowchart of an exemplary method by which a processor core processes a translation load instruction in accordance with one embodiment.

With reference now to FIG. 5, there is illustrated a high level logical flowchart of an exemplary method by which an execution unit 202 of a processor core 200 executes a translation load instruction 300 in accordance with one embodiment.

The process of FIG. 5 begins at block 500, for example, in response to receipt by the execution unit 202 of a translation load instruction 300 to be executed. In some use cases, one or more translation load instructions 300 may be executed within a hardware thread of execution of the processor core 200 in order to load one or more address translations into translation structure(s) 206 in advance of execution of memory-referent instructions (in the same or another hardware thread of the processor core 200) that are dependent upon those address translation(s). As a result, execution of the subsequent memory-referent instructions will be accelerated by ability of MMU 204 to have low latency access to the address translation(s) within translation structure(s) 206 (rather than having to access each required address translation from page frame table 220).

In other use cases, a processor core 200 can execute a translation load instruction 300 in response to an interrupt caused by an NMMU 218. An NMMU 218 may interrupt a processor core 200 to cause the execution of a translation load instruction 300 for a particular effective address, for example, if the NMMU 218 has been requested by an accelerator 217 to translate the particular effective address and a corresponding PTE 222 is not present in page frame table 220 or the PTE 222 does not provide the requested access protections.

In response to execution of the translation load instruction 300, the execution unit 202 calculates an effective address within a memory page based on the contents of address field 314 of translation load instruction 300 (block 502). Based on the effective address calculated by execution unit 202 at block 502, the executing processor core 200 optionally determines at blocks 504 and 506, respectively, whether or not a translation entry for the effective address is present in each of the core translation structure(s) indicated by LD field 312 and has at least the access protections indicated by protection field 304. In response to affirmative determinations at both of optional blocks 504 and 506, no further processing of translation load instruction 300 is required, and the process of FIG. 5 ends at block 530. If, however, an affirmative determination is made at block 504 and a negative determination is made at block 506, a protection fault is detected, and the process of FIG. 5 accordingly passes through page connector A to block 520, which is described below. If a negative determination at block 504 or if optional blocks 504 and 506 are omitted, the process of FIG. 5 passes to block 510.

At block 510, processor core 200 initiates a walk of page frame table 220 by MMU 204 in order to locate, if possible, a PTE 222 corresponding to the effective address determined at block 502. At block 512 the MMU 204 determines whether or not the walk of page frame table 220 found the relevant PTE 222 in page frame table 220. If so, the process proceeds to block 516, which is described below. If not, a page fault is detected, and the executing processor core 200 invokes a page fault handler (block 514). The processing performed by an exemplary page fault handler to resolve the page fault is described below with reference to FIG. 6. Following execution of the page fault handler at block 514, the process of FIG. 5 ends at block 530.

Referring now to block 516, the executing processor core 200 determines whether or not the PTE 222 found by the walk of page frame table 220 includes access permissions in the protection field 404 of the PTE 222 at least as great as those specified in protection field 304 of the translation load instruction 300. For example, an affirmative determination will be made at block 516 if protection field 304 of the translation load instruction 300 specifies a read-only page (R=0) and protection field 404 specifies either a read-only page or a read-write page (R=0 . . . 1). Similarly, an affirmative determination will be made at block 516 if protection field 304 of the translation load instruction 300 specifies a non-executable memory page (E=0) and protection field 404 indicates either a non-executable or an executable memory page (E=0 . . . 1). Conversely, a negative determination will be made at block 516 if protection field 304 of the translation load instruction 300 specifies a read-write page (RW=1) and protection field 404 specifies a read-only page (RW=0) or if protection field 304 of the translation load instruction 300 specifies an executable memory page (E=1) and protection field 404 indicates a non-executable memory page (E=0).

In response to an affirmative determination at block 516, the process proceeds to block 522, which is described below. If, however, a negative determination is made at block 516, a protection fault is detected, and the executing processor core 200 invokes a protection fault handler (block 520). The processing performed by an exemplary protection fault handler to resolve the protection fault is described below with reference to FIG. 7. Following execution of the protection fault handler, the process of FIG. 5 ends at block 530.

Block 522 illustrates the executing processor core 200 determining whether or not any bit in LD field 312 of translation load instruction 300 is set to indicate that the requested address translation be loaded into one or more of translation structure(s) 206. If not, the processing of the translation load instruction 300 is complete, and the process of FIG. 5 accordingly ends at block 530. If, however, the executing processor core 200 determines at block 522 that at least one bit is set in LD field 312 to indicate that the requested address translation is to be loaded into one or more translation structure(s) 206, the executing processor core 200 further determines at block 524 whether or not the requested address translation is present in each translation structure 206 indicated by LD field 312 of translation load instruction 300. If not, the executing processor core 200 loads a translation entry providing the address translation into each translation structure 206 indicated by the LD field 312 of the translation load instruction 300 (block 526). As will be appreciated, loading the address translation entry into translation structure(s) 206 does not cause pollution of the cache hierarchy (i.e., L1, L2, etc.) of the executing processor core 200 because the update to translation structure(s) 206 performed in response to processing of the translation load instruction 300 is not connected with any regular data load access, data store access, or instruction fetch. Following block 526 or in response to an affirmative determination at block 524, processing of the translation load instruction 300 by the processor core 200 is completed, and the process of FIG. 5 ends at block 530.

Figure 6:
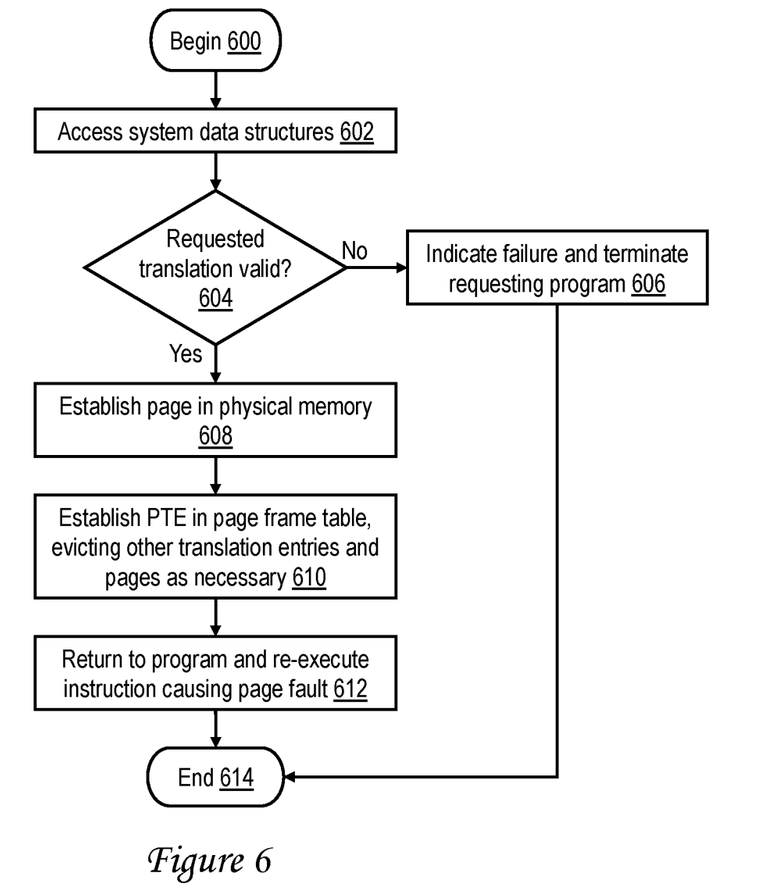
FIG. 6 is a high level logical flowchart of an exemplary method by which a page fault handler resolves a page fault in accordance with one embodiment.

Referring now to FIG. 6, there is depicted a high level logical flowchart of an exemplary method by which a page fault handler resolve a page fault in accordance with one embodiment. As noted above, the process of FIG. 6 can be performed, for example, at block 514 of FIG. 5 in response to detection of a page fault.

The process of FIG. 6 begins at block 600 with the invocation of execution of the page fault handler by a processor core 200 of data processing system 100. The process proceeds from block 600 to blocks 602-604, which illustrate the page fault handler accessing system data structures 224 to determine whether or not the effective address for which translation is requested is a valid address for translation. If not, the page fault handler indicates a translation failure and terminates execution of the program that requested the invalid address translation (block 606). Thereafter, the process of FIG. 6 ends at block 614.

In response to the page fault handler determining at block 604 that the effective address is a valid address for translation, the page fault handler establishes a new physical page corresponding to the effective address in system memory 108 (block 608). In addition, at block 610, the page fault handler establishes, within page frame table 220, a PTE 222 corresponding to the new physical page in system memory 108 and sets its valid bit 412 (block 610). Protection field 404 remains unset, ensuring at least one execution of the protection fault handler to set the requested access protections for the memory page. In establishing the new PTE 222 in page frame table 220 and corresponding physical page in system memory 108, the page fault handler may remove one or more other PTEs 222 from page frame table 220 and remove (page out) the corresponding physical page(s) from system memory 108.

After the PTE 222 providing the requested translation is established in page frame table 220, the page fault handler ends its execution and initiates the re-execution of the instruction that caused the page fault (block 612). In cases in which the instruction that caused the page fault was a translation load instruction 300, the translation load instruction 300 will then be re-executed, as described above with reference to FIG. 5. However, because a PTE 222 providing the required translation will be present in page frame table 220 when the translation load instruction 300 is re-executed, an affirmative determination will be made at block 512 (or block 504, if implemented), and a page fault will not again occur. However, a protection fault, invoking the protection fault handler at block 520, will occur on a newly established PTE 222 as no protection bits are set in protection field 404. Following block 612, the process of FIG. 6 ends at block 614.

Figure 7:
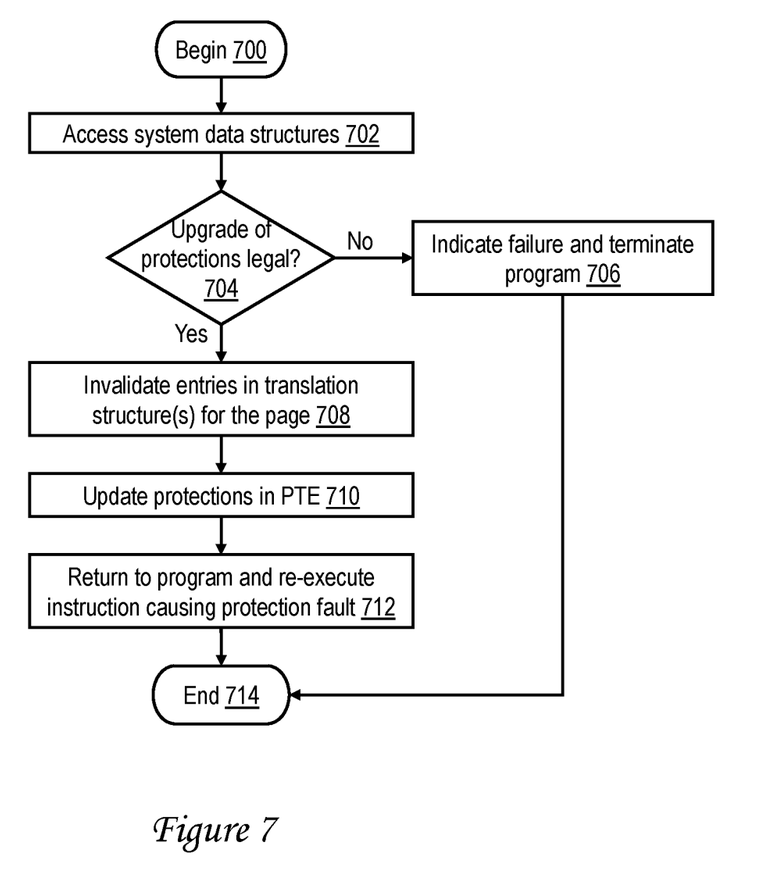
FIG. 7 is a high level logical flowchart of an exemplary method by which a protection fault handler resolves a protection fault in accordance with one embodiment.

With reference now to FIG. 7, there is illustrated a high level logical flowchart of an exemplary method by which a protection fault handler resolves a protection fault in accordance with one embodiment. As noted above, the process of FIG. 7 can be performed, for example, at block 520 of FIG. 5 in response to detection of a protection fault.

The process of FIG. 7 begins at block 700 with the invocation of execution of a protection fault handler by a processor 200 of data processing system 100. The process proceeds from block 700 to blocks 702-704, which illustrates the protection fault handler accessing system data structures 224 to determine whether or not the requested upgrade of access permission (e.g., from read-only to read-write or to set E bit 410 to indicate that the memory page contains executable instructions) is legal. If not, the protection fault handler indicates a protection failure and terminates execution of the program that requested the illegal modification of page protections (block 706). Thereafter, the process of FIG. 7 ends at block 714.

In response to the protection fault handler determining at block 704 that the requested modification of page protections is legal, the protection fault handler invalidates any entry for the relevant effective address in all translation structures 206 throughout data processing system 100 (block 708). For example, this invalidation can be accomplished through execution of a translation invalidation software sequence specific to the chosen architecture. In addition, at block 710, the protection fault handler updates, within page frame table 220, the protection field 404 of the relevant PTE 222 to reflect the new values, for example, requested in protection field 304 of translation load instruction 300 (block 710). The protection fault handler thereafter ends its execution and initiates the re-execution of the instruction that caused the protection fault (block 712). In cases in which the instruction that caused the protection fault was a translation load instruction 300, the translation load instruction 300 will then be re-executed, as described above with reference to FIG. 5. However, because a PTE 222 providing the requested protections will be present in page frame table 220 when the translation load instruction 300 is re-executed, an affirmative determination will be made at block 516 (or block 506, if implemented), and a protection fault will not again occur. Following block 712, the process of FIG. 7 ends at block 714.

Although the embodiment described above with reference to FIGS. 6-7 resolves page faults and protection faults utilizing separate handler routines, in other embodiments a page fault handler may also detect and resolve a protection fault. Such an embodiment could, in some cases, reduce the number of times that a translation load instruction 300 is re-executed at the expense of executing a longer and more complex page fault handler.

Figure 8:
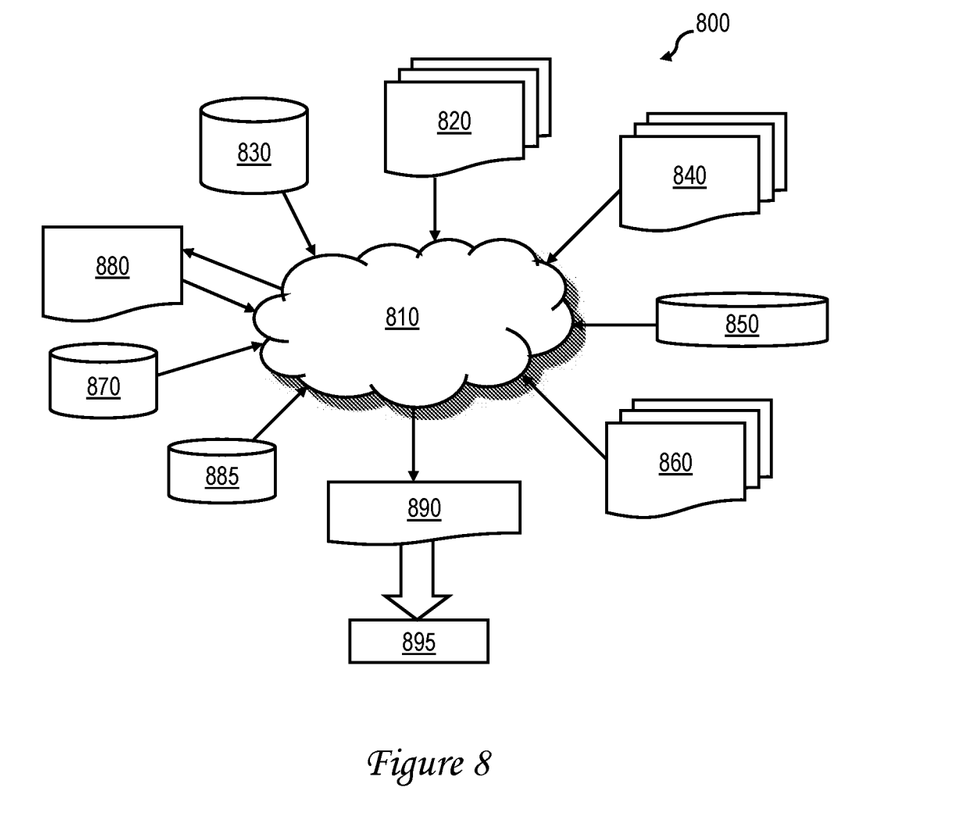
FIG. 8 is a data flow diagram illustrating a design process.

With reference now to FIG. 8, there is depicted a block diagram of an exemplary design flow 800 used for example, in semiconductor IC logic design, simulation, test, layout, and manufacture. Design flow 800 includes processes, machines and/or mechanisms for processing design structures or devices to generate logically or otherwise functionally equivalent representations of the design structures and/or devices described above and shown in FIGS. 1-2. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 800. Design structure 820 may be a logical simulation design structure generated and processed by design process 800 to produce a logically equivalent functional representation of a hardware device. Design structure 820 may also or alternatively comprise data and/or program instructions that when processed by design process 800, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 800 to simulate or otherwise functionally represent an electronic component, circuit, electronic or logic module, apparatus, device, or system such as those shown in FIGS. 1-2. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 800 preferably employs and incorporates hardware and/or software modules for synthesizing, translating, or otherwise processing a design/simulation functional equivalent of the components, circuits, devices, or logic structures shown in FIGS. 1-2 to generate a netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 800 may include hardware and software modules for processing a variety of input data structure types including netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 840, characterization data 850, verification data 860, design rules 870, and test data files 885 which may include input test patterns, output test results, and other testing information. Design process 800 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 800 without deviating from the scope and spirit of the invention. Design process 800 may also include modules for performing standard circuit design processes such as timing analysis, verification, design rule checking, place and route operations, etc.

Design process 800 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-2. In one embodiment, design structure 890 may comprise a compiled, executable HDL simulation model that functionally simulates the devices shown in FIGS. 1-2.

Design structure 890 may also employ a data format used for the exchange of layout data of integrated circuits and/or symbolic data format (e.g., information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-2. Design structure 890 may then proceed to a stage 895 where, for example, design structure 890: proceeds to tape-out, is released to manufacturing, is released to a mask house, is sent to another design house, is sent back to the customer, etc.

As has been described, in at least one embodiment, a processor core processes a translation load instruction including a protection field specifying a desired access protection to be specified in a translation entry for a memory page. Processing the translation load instruction includes calculating an effective address within the memory page and ensuring that a translation entry containing the desired access protection is stored within at least one translation structure of the data processing system.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of processing in a data processing system including a system memory, the method comprising:
 a processor core processing a translation load instruction, wherein the translation load instruction includes a protection field specifying a desired access protection to be specified in a translation entry for a memory page, and wherein processing the translation load instruction includes:
  calculating an effective address within the memory page;
  determining that the translation entry containing the desired access protection is stored within at least one translation structure of the data processing system;
  and based on determining that the translation entry containing the desired access protection is stored within the at least one translation structure, ending processing of the translation load instruction without further processing of the translation load instruction;
 wherein the translation load instruction is unrelated to a data load, data store, or instruction fetch access.

2. The method of claim 1, wherein:
 the at least one translation structure includes a first translation structure in the processor core of a processing unit;
 the translation load instruction includes a load field;
 the method further comprises the processor core, based on the load field being set, installing the translation entry for the effective address in the first translation structure in the processor core.

3. The method of claim 2, wherein the first translation structure comprises a translation lookaside buffer.

4. The method of claim 2, wherein:
 the at least one data structure includes a plurality of different translation structures in the processing unit, said plurality of different translation structures including the first translation structure;
 and the load field comprises one or more bits, each of the one or more bits individually specifies into which of the plurality of different translation structures the translation entry is to be installed.

5. The method of claim 1, wherein the at least one translation structure includes a page frame table in the system memory.

6. The method of claim 1, wherein:
 the protection field in the translation load instruction is a first protection field;
 the translation entry includes a second protection field;
 and the method further comprises the processor core invoking a protection fault handler based on a mismatch of access protections specified in the first and second protection fields.

7. The method of claim 6, and further comprising:
 determining whether a modification of access protections requested by the translation load instruction is legal; and
 responsive to determining the modification of access protections requested by the translation load instruction is legal, updating the second protection field in the translation entry.

8. The method of claim 1, wherein:
 the data processing system includes a nest memory management unit coupled to a system fabric of the data processing system;
 and the processing comprises the processor core processing the translation load instruction based on receiving an interrupt initiated by the nest memory management unit.

9. A processing unit for a data processing system, the processing unit comprising:
 a processor core including:
  a memory management unit that translates effective addresses to real addresses;
  and an execution unit that executes instructions;
 wherein the processor core is configured to perform:
  processing a translation load instruction, wherein the translation load instruction includes a protection field specifying a desired access protection to be specified in a translation entry for a memory page, and wherein processing the translation load instruction includes:
   calculating an effective address within the memory page;
   determining whether the translation entry containing the desired access protection is stored within at least one translation structure of the data processing system;
   based on determining the translation entry containing the desired access protection is not stored within the at least one translation structure, loading the translation entry with the desired access protection in the at least one translation structure;

and based on determining the translation entry containing the desired access protection is stored within the at least one translation structure, ending processing of the translation load instruction without further processing of the translation load instruction;

wherein the translation load instruction is unrelated to a data load, data store, or instruction fetch access.

10. The processing unit of claim 9, wherein:

the at least one translation structure includes a first translation structure in the processor core;

the translation load instruction includes a load field;

the processor core is configured, based on the load field being set, to install the translation entry for the effective address in the first translation structure in the processor core.

11. The processing unit of claim 10, wherein the first translation structure comprises a translation lookaside buffer.

12. The processing unit of claim 10, wherein:

the at least one data structure includes a plurality of different translation structures in the processing unit, said plurality of different translation structures including the first translation structure;

and the load field comprises one or more bits, each of the one or more bits individually specifies into which of the plurality of different translation structures the translation entry is to be installed.

13. The processing unit of claim 9, wherein the at least one translation structure includes a page frame table in the system memory.

14. The processing unit of claim 9, wherein:

the protection field in the translation load instruction is a first protection field;

the translation entry includes a second protection field; and the processor core invokes a protection fault handler based on a mismatch of access protections specified in the first and second protection fields.

15. The processing unit of claim 14, wherein the processor core is further configured to perform:

determining whether a modification of access protections requested by the translation load instruction is legal; and responsive to determining the modification of access protections requested by the translation load instruction is legal, updating the second protection field in the translation entry.

16. The processing unit of claim 9, wherein:

the data processing system includes a nest memory management unit coupled to a system fabric of the data processing system; and the processor core processes the translation load instruction based on receiving, via the system fabric, an interrupt initiated by the nest memory management unit.

17. A data processing system including a plurality of processing units according to claim 9 and a system fabric coupling the plurality of processing units.

18. A program product, comprising:

a computer-readable storage device;

and a design structure stored in the computer-readable storage device for designing, manufacturing, or testing an integrated circuit, the design structure comprising:

a processing unit for a data processing system, the processing unit including:

a processor core including:

a memory management unit that translates effective addresses to real addresses;

and an execution unit that executes instructions;

wherein the processing unit is configured to perform:

processing a translation load instruction, wherein the translation load instruction includes a protection field specifying a desired access protection to be specified in a translation entry for a memory page, and wherein processing the translation load instruction includes:

calculating an effective address within the memory page;

and determining whether the translation entry containing the desired access protection is stored within at least one translation structure of the data processing system;

based on determining the translation entry containing the desired access protection is not stored within the at least one translation structure, loading the translation entry with the desired access protection in the at least one translation structure;

and based on determining the translation entry containing the desired access protection is stored within the at least one translation structure, ending processing of the translation load instruction without further processing of the translation load instruction;

wherein the translation load instruction is unrelated to a data load, data store, or instruction fetch access.

19. The program product of claim 18, wherein:

the at least one translation structure includes a first translation structure in the processor core;

the translation load instruction includes a load field;

the processor core is configured, based on the load field being set, to install the translation entry for the effective address in the first translation structure in the processor core.

20. The program product of claim 19, wherein the first translation structure comprises a translation lookaside buffer.

21. The program product of claim 18, wherein the at least one translation structure includes a page frame table in the system memory.

22. The program product of claim 18, wherein:

the protection field in the translation load instruction is a first protection field;

the translation entry includes a second protection field; and the processor core invokes a protection fault handler based on a mismatch of access protections specified in the first and second protection fields.

* * * * *